US011608268B2

(12) United States Patent
Li et al.

(10) Patent No.: US 11,608,268 B2
(45) Date of Patent: Mar. 21, 2023

(54) METHOD AND DEVICE FOR PREPARING CARBON NANOTUBE AND CARBON NANOTUBE PREPARED THEREBY

(71) Applicant: JIANGXI YUEAN ADVANCED MATERIALS CO., LTD., Jiangxi (CN)

(72) Inventors: Shangkui Li, Jiangxi (CN); Bing Wang, Jiangxi (CN); Bo Li, Jiangxi (CN); Xianxin Li, Jiangxi (CN); Haiping Zou, Jiangxi (CN); Minfeng Zhu, Jiangxi (CN)

(73) Assignee: JIANGXI YUEAN ADVANCED MATERIALS CO., LTD., Jiangxi (CN)

( * ) Notice: Subject to any disclaimer, the term of this patent is extended or adjusted under 35 U.S.C. 154(b) by 390 days.

(21) Appl. No.: 16/763,205

(22) PCT Filed: Nov. 8, 2018

(86) PCT No.: PCT/CN2018/114661
§ 371 (c)(1),
(2) Date: May 11, 2020

(87) PCT Pub. No.: WO2019/100949
PCT Pub. Date: May 31, 2019

(65) Prior Publication Data
US 2021/0070614 A1 Mar. 11, 2021

(30) Foreign Application Priority Data

Nov. 22, 2017 (CN) .......................... 201711174048.4

(51) Int. Cl.
*C01B 32/162* (2017.01)
*C01B 32/164* (2017.01)
(Continued)

(52) U.S. Cl.
CPC .......... *C01B 32/162* (2017.08); *B01J 8/1872* (2013.01); *B01J 8/42* (2013.01); *B01J 23/755* (2013.01); *C01B 32/164* (2017.08)

(58) Field of Classification Search
CPC ............................ C01B 32/16; C01B 32/162
See application file for complete search history.

(56) References Cited

U.S. PATENT DOCUMENTS 3,800,740 A 4/1974 Robinson
6,692,717 B1 * 2/2004 Smalley ............... C01B 32/162
423/445 B
(Continued)

FOREIGN PATENT DOCUMENTS

BE 863331 A * 7/1978 .............. B01J 23/46
CN 1673073 A 9/2005
(Continued)

OTHER PUBLICATIONS

Kuo, H. P., C. T. Wu, and R. C. Hsu. "Continuous toluene vapour photocatalytic deduction in a multi-stage fluidised bed." Powder technology 210.3 (2011): 225-229.*
(Continued)

*Primary Examiner* — Richard M Rump
(74) *Attorney, Agent, or Firm* — Marshall, Gerstein & Borun LLP

(57) ABSTRACT

A method and a device for preparing a carbon nanotube and a prepared carbon nanotube. The method includes: adding iron pentcarbonyl and nickel tetracarbonyl into a multi-stage series fluidized bed and performing decomposition to obtain a catalyst, and discharging the carbon monoxide generated; adding a carbon source and injecting an inert gas into the series fluidized bed for reaction under heating at 600-800° C. for 40-90 min, the ratio of the mass of carbon in the carbon source to the mass of the catalyst being 5-7:3-5. Further provided are a device for preparing a carbon nanotube
(Continued)

according to the above method and a carbon nanotube prepared by the above method.

10 Claims, 5 Drawing Sheets

(51) Int. Cl.
  *B01J 8/18* (2006.01)
  *B01J 8/42* (2006.01)
  *B01J 23/755* (2006.01)

(56) References Cited

U.S. PATENT DOCUMENTS

| | | | |
|---|---|---|---|
| 2002/0102193 A1 | 8/2002 | Smalley et al. | |
| 2004/0234445 A1 | 11/2004 | Serp et al. | |
| 2009/0087371 A1 | 4/2009 | Jang et al. | |
| 2017/0144887 A1* | 5/2017 | Li | B82Y 40/00 |

FOREIGN PATENT DOCUMENTS

| | | | |
|---|---|---|---|
| CN | 104779371 A | * | 7/2015 |
| CN | 107720725 A | | 2/2018 |
| JP | S61-215694 A | | 9/1986 |
| WO | WO-2004043858 A1 | | 5/2004 |

OTHER PUBLICATIONS

Zhang, Qiang, et al. "Mass production of aligned carbon nanotube arrays by fluidized bed catalytic chemical vapor deposition." Carbon 48.4 (2010): 1196-1209.*

Bradley, Robert Kelley. Large scale production of single wall carbon nanotubes. Rice University, 2000.*

International Search Report Translation for Application No. PCT/CN2018/114661, dated Jan. 30, 2019.

EP Office Action, for Corresponding European Application No. 18880959.4, dated Feb. 3, 2021.

* cited by examiner

METHOD AND DEVICE FOR PREPARING CARBON NANOTUBE AND CARBON NANOTUBE PREPARED THEREBY

CROSS-REFERENCE TO RELATED APPLICATION

The present application is the US national phase of International Patent Application No. PCT/CN2018,114611, filed Nov. 8, 2018, which claims priority of Chinese Patent Application with the filing number 201711174048.4, entitled "Method and Device for Preparing Carbon Nanotube" filed with the Chinese Patent Office on Nov. 22, 2017, the contents of which are incorporated herein by reference their entirety.

TECHNICAL FIELD

The present disclosure relates to the technical field of preparation of carbon nanotubes, in particular to a method and a device for preparing a carbon nanotube and a carbon nanotube prepared thereby.

BACKGROUND ART

Carbon nanotubes, also known as buckytubes, are a type of one-dimensional quantum materials having special structures (with radial dimensions of the order of nanometers, axial dimensions are of the order of micrometers, and two ends of the tubes are substantially sealed). Carbon nanotubes are coaxial circular tubes mainly consisting of several to tens of layers of carbon atoms arranged in a hexagonal arrangement pattern. The layers are kept at a constant distance therebetween of about 0.34 nm, and the carbon nanotubes typically have a diameter of 2~20 nm. As a one-dimensional nano material, the carbon nanotube not only has light weight, but also has perfect connection of a hexagonal structure, and has many extraordinary mechanical, electrical and chemical performances. At present, the existing catalysts for preparing carbon nanotubes are usually prepared by loading iron and molybdenum on aluminum oxide, or loading iron, nickel, and copper on aluminum oxide or magnesium oxide, or directly using metal alloy powder of iron, nickel and so on. However, the carbon nanotubes prepared using these catalysts have only fair performances, and most of the carbon nanotubes prepared using these catalysts are subjected to processes of acid washing and water washing in later purification, while certain environmental pollution exists in this process.

SUMMARY

Objects of the present disclosure include providing a method for preparing a carbon nanotube, aiming at addressing the problem that the carbon nanotube prepared in the prior art has an only fair performance.

The method for preparing a carbon nanotube provided in the present disclosure includes following preparation steps:
adding iron pentacarbonyl and nickel tetracarbonyl into fluidized beds of multiple stages connected in series and performing decomposition to obtain a nano iron-nickel composite catalyst having a particle size of 1~10 nm, and discharging carbon monoxide generated; and
adding a carbon source and introducing an inert gas into the fluidized beds of multiple stages connected in series, with a ratio of the mass of carbon in the carbon source to the mass of the catalyst being 5~7:3~5, and performing reaction under a condition of heating at 600~800° C. for 40~90 min, to generate a composite carbon nanotube, wherein in the composite carbon nanotube a mass percentage of content of carbon is 50%~70%, and a mass percentage of content of the catalyst is 30%~50%.

Further, a mixture of the iron pentacarbonyl and the nickel tetracarbonyl is added into the fluidized beds, and a heating temperature of the fluidized beds is controlled between 225~315° C.

Further, a mass ratio of the iron pentacarbonyl to the nickel tetracarbonyl is 370~392:163~178.

Further, after the reaction in the fluidized beds of multiple stages connected in series is finished, a gas-solid mixture generated in the fluidized beds of multiple stages connected in series is separated by a gas-solid separator to obtain the composite carbon nanotube.

Further, the method further includes purification carried out for the composite carbon nanotube separated by the gas-solid separator, wherein a purification step includes:
disposing the composite carbon nanotube in an atmosphere of carbon monoxide under a condition with a pressure of 150~200 atm and a temperature of 38~55° C. to synthesize nickel tetracarbonyl, so as to remove metal nickel from the composite carbon nanotube to obtain a secondary carbon nanotube; and
disposing the secondary carbon nanotube in an environment containing carbonic oxide and having a pressure of 150~200 atm and a temperature of 190~250° C. to generate iron pentacarbonyl, so as to remove metal iron in the secondary carbon nanotube, and obtain a carbon nanotube of high purity.

Further, the fluidized beds of multiple stages connected in series are disposed in an electromagnetic field.

Further, the carbon source includes a hydrocarbon gas.

Objects of the present disclosure further include providing a device for preparing a carbon nanotube, so as raise the yield of the carbon nanotubes prepared.

The device for preparing a carbon nanotube provided in the present disclosure is configured to implement the above method for preparing a carbon nanotube. The device includes fluidized beds of multiple stages connected in series, wherein the fluidized beds of multiple stages connected in series include a first-stage fluidized bed, a second-stage fluidized bed and a third-stage fluidized bed sequentially connected in series, and at least one second-stage fluidized bed is provided; the first-stage fluidized bed includes a first heating section provided in an upper portion of the first-stage fluidized bed and a second heating section provided in a lower portion of the first-stage fluidized bed, wherein the first heating section is configured to provide a temperature for decomposing a mixture of iron pentacarbonyl and nickel tetracarbonyl, and the second heating section is configured to provide a growth temperature for the carbon nanotube; a carbon monoxide discharge port is provided in the upper portion of the first-stage fluidized bed, a bottom portion of the first-stage fluidized bed is provided with an air inlet, and an upper portion of the third-stage fluidized bed is provided with a product discharge port, which is communicated with a gas-solid separator.

Objects of the present disclosure further include providing a device for preparing a carbon nanotube, so as improve the performance of the carbon nanotube prepared thereby.

The device for preparing a carbon nanotube provided in the present disclosure is configured to implement the above method for preparing a carbon nanotube. The device includes fluidized beds of multiple stages connected in series, wherein the fluidized beds of multiple stages connected in series include a first-stage fluidized bed and a third-stage fluidized bed sequentially connected in series, the first-stage fluidized bed includes a first heating section provided in an upper portion of the first-stage fluidized bed and a second heating section provided in a lower portion of the first-stage fluidized bed, wherein the first heating section is configured to provide a temperature for decomposing a mixture of iron pentacarbonyl and nickel tetracarbonyl, and the second heating section is configured to provide a growth temperature of the carbon nanotube, a carbon monoxide discharge port is provided in the upper portion of the first-stage fluidized bed, a bottom portion of the first-stage fluidized bed is provided with an air inlet, and an upper portion of the third-stage fluidized bed is provided with a product discharge port, which is communicated with a gas-solid separator.

Further, a flow equalizing device is provided in the lower portion of the first-stage fluidized bed, wherein the flow equalizing device is located above the air inlet.

Further, the flow equalizing device includes a screen plate provided with a plurality of through holes.

Further, the device further includes a magnetic field generating device, wherein the magnetic field generating device includes a first magnetic pole and a second magnetic pole, wherein the first magnetic pole is located at one end of the fluidized beds of multiple stages connected in series, and the second magnetic pole is located at the other end of the fluidized beds of multiple stages connected in series.

Further, the first magnetic pole and the second magnetic pole each are in a strip-shaped structure, and the first magnetic pole and the second magnetic pole are provided to extend in a length direction of the fluidized beds.

Further, in an optional embodiment of the present disclosure, each fluidized bed is communicated through a respective connecting pipe, an upper portion of a fluidized bed of a previous stage is communicated with a lower portion of a fluidized bed of a next stage, wherein the connecting pipe communicated with the first-stage fluidized bed is a first connecting pipe, the first connecting pipe is communicated with the first-stage fluidized bed at the first heating section, and the carbon monoxide discharge port is provided at a position on the first connecting pipe close to the first-stage fluidized bed.

Further, an insulating layer is wrapped outside each of the first heating section and/or the second heating section.

Further, the first-stage fluidized bed and the third-stage fluidized bed are communicated with each other through a circulating pipe provided therebetween; and one end of the circulating pipe is communicated with a product discharge port of the third-stage fluidized bed, and the other end of the circulating pipe is communicated with an air inlet of the first-stage fluidized bed.

Further, a feeding device is provided in the top portion of the first-stage fluidized bed, wherein the feeding device is configured to make a mixture of iron pentacarbonyl and nickel tetracarbonyl or a carbon source enter the first-stage fluidized bed.

Objects of the present disclosure further include providing a carbon nanotube prepared by the above method for preparing a carbon nanotube.

The present disclosure has at least following beneficial effects: in the method for preparing a carbon nanotube obtained by the above design in the present disclosure, as in the method for preparing a carbon nanotube provided in the present disclosure, iron pentacarbonyl and nickel tetracarbonyl are used to enter the reaction device, and are decomposed to generate the iron-nickel alloy as a catalyst having a uniform nanoscale particle size before growth of the carbon nanotube, the carbon nanotube prepared is enabled to have a good quality; and by reasonably controlling the reaction time, and adjusting the ratio of the catalyst to the carbon in the carbon source, the carbon and the iron-nickel alloy in the composite carbon nanotube prepared have a relatively preferable mass ratio, so that not only the composite carbon nanotube prepared has a high magnetization intensity and a large coercive force, but also the composite carbon nanotube can easily react with carbon monoxide at this ratio to remove iron-nickel alloy contained therein and generate iron carbonyl and nickel carbonyl that can be recycled. In this process, no acid washing for impurity removal or high temperature for impurity removal is needed, which can reduce the production cost, and is more environment-friendly.

The device for preparing a carbon nanotube obtained by the above design in the present disclosure, due to reasonable arrangement of each unit, can be used for implementing the method provided in the present disclosure, so as to prepared carbon nanotubes with relatively preferable performance. As the configuration in which multiple fluidized beds can be connected in series is used in the device, the number of fluidized beds of the device can be adjusted according to production requirement of actual production.

The carbon nanotube prepared by the above method for preparing a carbon nanotube in the present disclosure has a good performance.

BRIEF DESCRIPTION OF DRAWINGS

In order to more clearly illustrate technical solutions of embodiments of the present disclosure, accompanying drawings which need to be used in the embodiments will be introduced below briefly. It should be understood that the accompanying drawings below merely show some embodiments of the present disclosure, and therefore should not be considered as limitation on the scope. A person ordinarily skilled in the art still could obtain other relevant accompanying drawings based on these accompanying drawings, without inventive efforts.

Figure 1:
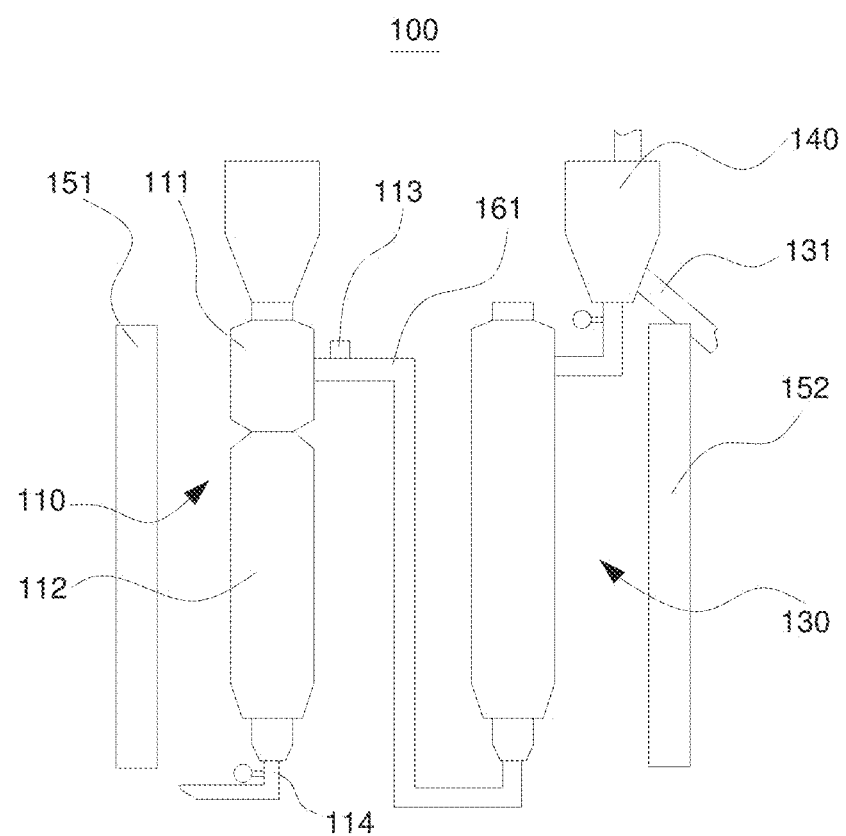
FIG. 1 is a structural schematic diagram of a device for preparing a carbon nanotube provided in an embodiment of the present disclosure.

Reference signs: 100—device for preparing a carbon nanotube; 110—first-stage fluidized bed; 111—first heating section; 112—second heating section; 113—carbon monoxide discharge port; 114—air inlet; 115—flow equalizing device; 130—third-stage fluidized bed; 131—product discharge port; 140—gas-solid separator; 151—first magnetic pole; 152—second magnetic pole; 161—first connecting pipe; 200—device for preparing a carbon nanotube; 210—first-stage fluidized bed; 214—air inlet; 217—inert gas inlet pipe; 218—first valve; 219—second valve; 230—third-stage fluidized bed; 231—product discharge port; 232—product discharge pipe; 238—third valve; 240—gas-solid separator; 251—circulating pipe; 300—device for preparing a carbon nanotube; 310—first-stage fluidized bed; 361—first connecting pipe; 362—second connecting pipe; 320—second-stage fluidized bed; 330—third-stage fluidized bed; 370—feeding device; 371—rotary feeder; 372—feeding port; 400—device for preparing a carbon nanotube; 440—gas-solid separator; 480—first purification device; 490—second purification device.

DETAILED DESCRIPTION OF EMBODIMENTS

In order to make the objects, technical solutions and advantages of the embodiments of the present disclosure clearer, the technical solutions in the embodiments of the present disclosure will be described below clearly and completely. If no specific conditions are specified in the embodiments, they are carried out under conventional conditions or conditions recommended by manufacturers. If manufacturers of reagents or apparatuses used are not specified, they are all conventional products commercially available.

A method and a device for preparing a carbon nanotube provided in embodiments of the present disclosure will be specifically illustrated below.

A method for preparing a carbon nanotube is provided, which includes following preparation steps:

S1, adding iron pentacarbonyl and nickel tetracarbonyl into fluidized beds of multiple stages connected in series and performing decomposition to obtain a catalyst, and discharging carbon monoxide generated.

Specifically, the iron pentacarbonyl and the nickel tetracarbonyl are added into a first-stage fluidized bed from a top end of the fluidized bed, and decomposed under a high-temperature condition in an upper portion of the first-stage fluidized bed to generate iron, nickel and carbon monoxide, after the reaction is finished, the carbon monoxide is discharged, and the discharged carbon monoxide can be pumped out by vacuum pumping using a vacuum pump. In the method for preparing a carbon nanotube provided in the present disclosure, the carbon nanotube is prepared by using iron-nickel alloy as a catalyst, and the iron pentacarbonyl and nickel tetracarbonyl are selected as raw materials and directly added into a reaction device to prepare the catalyst in situ, because iron powder and nickel powder obtained from decomposition of the iron pentacarbonyl and nickel tetracarbonyl are both nano-scale and have uniform particle size, and when they act as catalyst, the carbon nanotube prepared thereby has a good performance.

By providing the vacuum pump so as to discharge the carbon monoxide obtained from the reaction, not only the discharging efficiency of carbon monoxide is improved, but also the residual of carbon monoxide in the fluidized beds is reduced, such that the prepared carbon nanotube has a higher purity.

Optionally, the decomposition temperature of iron pentacarbonyl and nickel tetracarbonyl in the first-stage fluidized bed is controlled between 225~315° C. At this temperature, the iron pentacarbonyl and nickel tetracarbonyl can be decomposed to iron, nickel and carbon monoxide.

Further, a mass ratio of iron pentacarbonyl and nickel tetracarbonyl added is 370~392:163~178. With such setting, the mass ratio of iron-nickel alloy powder obtained after the decomposition of iron pentacarbonyl and nickel tetracarbonyl is a relatively preferable mass ratio which serves as a catalyst, and the unpurified composite carbon nanotube prepared under the condition of such mass ratio has a higher magnetization intensity, and a larger coercive force.

S2, adding a carbon source and introducing an inert gas into the fluidized beds of multiple stages connected in series (multi-stage series fluidized bed), with a ratio of the mass of carbon in the carbon source to the mass of the catalyst being 5~7:3~5, carrying out the reaction under a condition of heating at 600~800° C. for 40~90 min such that a mass percentage of content of the catalyst is 50%~70% in the resulting carbon nanotube, and introducing the gas-solid mixture after the reaction into a next unit after a mass percentage content of carbon is 30%~50%.

Specifically, after the carbon monoxide in the first-stage fluidized bed is discharged, the inert gas is introduced (or injected) into the fluidized beds of multiple stages connected in series so that the catalyst can enter each fluidized bed along with the flow of the inert gas; then, a gaseous carbon source is introduced, during which process the inert gas is always introduced into the fluidized beds of multiple stages.

Specifically, the added carbon source may be a hydrocarbon gas. Moreover, in the process of preparing the carbon nanotube, the hydrocarbon gas and the inert gas can be added together from a bottom end of the first-stage fluidized bed, wherein the inert gas can be at least one selected from the group consisting of nitrogen and argon.

Optionally, the hydrocarbon gas may be methane.

By keeping the ratio of the mass of carbon in the added carbon source to the mass of the catalyst to be 5~7:3~5, and controlling the reaction time of the reaction device to be 40~90 min under the temperature condition of 600~800° C., the mass percentage of content of carbon can be 50%~70%, and the mass percentage of content of the catalyst can be 30%~50% in the finally obtained carbon nanotube, while there is hardly any residual of either the carbon source or the catalyst, and the gas-solid mixture after the reaction is introduced into the next unit.

In the present disclosure, by keeping the mass percentage of content of carbon between 50%~70%, and the mass percentage of content of the catalyst between 30%~50% in the carbon nanotube prepared, the prepared composite carbon nanotube is enabled to have relatively high conductivity, good magnetization intensity, and large coercive force, moreover, iron pentacarbonyl and nickel tetracarbonyl which are produced in the subsequent purification treatment process by reaction between carbon monoxide and iron and nickel in the composite carbon nanotube can also be conveniently removed. In addition, the content of the catalyst in the carbon nanotube should not be excessively high, because an excessively high content of catalyst will greatly reduce the performance of the carbon nanotube after purification; similarly, the content of the catalyst in the carbon nanotube should not be excessively low, as an excessively low content of catalyst can hardly participate in the reaction with carbon monoxide.

S3, separating, after the reaction in the fluidized beds of multiple stages connected in series is finished, the gas-solid mixture generated in the fluidized beds of multiple stages connected in series by using a gas-solid separator, to obtain the composite carbon nanotube, and purifying the composite carbon nanotube.

Specifically, after the reaction in the fluidized beds of multiple stages connected in series is finished, the gas-solid mixture is introduced into the gas-solid separator to separate gas from solid, so that the gas therein is recovered, and the solid composite carbon nanotube is subjected to a purification operation of removing iron and nickel.

Firstly, the composite carbon nanotube is placed in a high-pressure environment filled with carbon monoxide, wherein the temperature of the high-pressure environment is controlled between 38~55° C., such that the carbon monoxide reacts with nickel in the composite carbon nanotube to generate nickel tetracarbonyl in liquid state, and subsequently the resultant product is subjected to a solid-liquid separation operation to recover nickel tetracarbonyl therein, thereby obtaining the carbon nanotube containing iron.

Then, the carbon nanotube containing iron is placed in a high-pressure environment filled with carbon monoxide, the temperature of the high-pressure environment is controlled between 190~250° C., such that the carbon monoxide reacts with iron in the carbon nanotube to generate liquid iron pentacarbonyl, and subsequently a resultant product is subjected to a solid-liquid separation operation to recover iron pentacarbonyl therein, thereby obtaining the purified carbon nanotube.

It should be noted that, the order of the above two purification steps can also alternated, and specific purification steps are as follows: firstly, placing the composite carbon nanotube in a high-pressure environment filled with carbon monoxide, and controlling the temperature of the high-pressure environment between 190~250° C., such that the carbon monoxide reacts with iron in the carbon nanotube to generate liquid iron pentacarbonyl, and subsequently carrying out a solid-liquid separation operation on the resultant product so as to recover iron pentacarbonyl therein, thereby obtaining the carbon nanotube containing nickel; then, placing the carbon nanotube containing nickel above described in a high-pressure environment filled with carbon monoxide, and controlling the temperature of the high-pressure environment between 38~55° C., such that the carbon monoxide reacts with nickel in the carbon nanotube to generate nickel tetracarbonyl in liquid state, and subsequently carrying out a solid-liquid separation operation to the resultant product so as to recover nickel tetracarbonyl therein, thereby obtaining the purified carbon nanotube.

Besides, it also should be noted that the above high-pressure environment refers to an environment with a pressure of 150~200 atm.

The later purification of existing carbon nanotubes is usually acid washing or high-temperature evaporation for treating impurities contained therein, but the acid washing or the high-temperature evaporation is high in cost, and the acid washing also produces acid washing waste liquid. By making iron and nickel in the composite carbon nanotube react with carbon monoxide to generate nickel tetracarbonyl and iron pentacarbonyl, and recovering nickel tetracarbonyl and iron pentacarbonyl generated in the reaction so as to be used again for the preparation of the carbon nanotube, cyclic utilization of intermediate substances in the preparation process of carbon nanotube is realized, thus waste of resources is reduced. Moreover, such purification manner also well overcomes the defects of high cost and serious environmental pollution of the conventional method of acid washing and high-temperature evaporation, and is more environment-friendly.

Further, the fluidized beds of multiple stages connected in series can be placed in an electromagnetic field. When the fluidized beds of multiple stages connected in series are placed in a magnetic field, the catalyst in each fluidized bed is arranged in a direction of magnetic induction lines, so that the carbon nanotube also grows in the direction of magnetic induction lines, thus the carbon nanotube finally prepared has a more regular shape and a better performance.

A method for preparing a carbon nanotube provided in the present disclosure is described in detail below in combination with specific embodiments.

Embodiment 1

Firstly, iron pentacarbonyl and nickel tetracarbonyl in a mass ratio of 370:163 are weighed, and a carbon source containing carbon in a mass ratio of 5~7:3~5 to the iron pentacarbonyl and the nickel tetracarbonyl is prepared; a mixture of the iron pentacarbonyl and the nickel tetracarbonyl is added into a first-stage fluidized bed among fluidized beds of multiple stages connected in series, and heated at 225° C. to be decomposed to obtain a catalyst; then, carbon monoxide is pumped out, and an inert gas is introduced into the fluidized beds of multiple stages, then the catalyst is distributed into each fluidized bed under the flowing action of the inert gas, and each stage of fluidized bed is kept at a temperature of 600° C. for reaction for 90 min. The above operations are all carried out under the condition of magnetic field.

After a mass ratio of the carbon content in the carbon nanotube finally generated to the catalyst is 5~7:3~5, the gas-solid mixture after the reaction is introduced into a gas-solid separator for gas-solid separation, and a solid composite carbon nanotube obtained is purified, wherein specific steps of the purification include: firstly, removing nickel from the composite carbon nanotube in a high-pressure environment containing carbon monoxide and having a temperature of 38° C.; then, removing iron from the composite carbon nanotube in a high-pressure environment and containing carbon monoxide and having a temperature of 190° C., so as to finally obtain a purified carbon nanotube.

Such configuration reduces the working temperature of each stage of fluidized bed, thereby reducing the heat radiated to the ambient during the preparation of the carbon nanotube.

Embodiment 2

Firstly, iron pentacarbonyl and nickel tetracarbonyl in a mass ratio of 390:178 are weighed, and a carbon source containing carbon in a mass ratio of 5~7:3~5 to the iron pentacarbonyl and the nickel tetracarbonyl is prepared; a mixture of the iron pentacarbonyl and the nickel tetracarbonyl is added into a first-stage fluidized bed among fluidized beds of multiple stages connected in series, and heated at 315° C. to be decomposed to obtain a catalyst; then, carbon monoxide is pumped out, and an inert gas is introduced into the fluidized beds of multiple stages, then the catalyst is distributed into each fluidized bed under the flowing action of the inert gas, and each stage of fluidized bed is kept at a temperature of 800° C. for reaction for 40 min. The above operations are all carried out under the condition of magnetic field.

After a mass ratio of the carbon content in the carbon nanotube finally generated to the catalyst is 5~7:3~5, the gas-solid mixture after the reaction is introduced into a gas-solid separator for gas-solid separation, and a solid composite carbon nanotube obtained is purified, wherein specific steps of the purification include: firstly, removing nickel from the composite carbon nanotube in a high-pressure environment containing carbon monoxide and having a temperature of 55° C.; then, removing iron from the composite carbon nanotube in a high-pressure environment containing carbon monoxide and having a temperature of 250° C., so as to finally obtain a purified carbon nanotube.

By keeping the temperature of each stage of fluidized bed at 800° C. for reaction, the time of catalytic reaction is greatly shortened, such that the carbon nanotube can be obtained in a short time, thereby improving the preparation efficiency of the carbon nanotube.

Embodiment 3

Firstly, iron pentacarbonyl and nickel tetracarbonyl in a mass ratio of 390:178 are weighed, and a carbon source containing carbon in a mass ratio of 5~7:3~5 to the iron pentacarbonyl and the nickel tetracarbonyl is prepared; a mixture of the iron pentacarbonyl and the nickel tetracarbonyl is added into a first-stage fluidized bed among fluidized beds of multiple stages connected in series, and heated at 315° C. to be decomposed to obtain a catalyst; then, carbon monoxide is pumped out, and an inert gas is introduced into the fluidized beds of multiple stages, then the catalyst is distributed into each fluidized bed under the flowing action of the inert gas, and each stage of fluidized bed is kept at a temperature of 700° C. for reaction for 50 min. The above operations are all carried out under the condition of magnetic field.

After a mass ratio of the carbon content in the carbon nanotube finally generated to the catalyst is 5~7:3~5, the gas-solid mixture after the reaction is introduced into a gas-solid separator for gas-solid separation, and a solid composite carbon nanotube obtained is purified, wherein specific steps of the purification include: firstly, removing nickel from the composite carbon nanotube in a high-pressure environment containing carbon monoxide and having a temperature of 55° C.; then, removing iron from the composite carbon nanotube in a high-pressure environment containing carbon monoxide and having a temperature of 250° C., so as to finally obtain a purified carbon nanotube.

By keeping each stage of fluidized bed at 700° C. for reaction for 50 min, balance is realized between the reaction temperature and the reaction time, which reduces the heat radiated from each stage of fluidized bed to the ambient while ensuring the preparation efficiency of the carbon nanotube.

Embodiment 4

Firstly, iron pentacarbonyl and nickel tetracarbonyl in a mass ratio of 375:168 are weighed, and a carbon source containing carbon in a mass ratio of 5~7:3~5 to the iron pentacarbonyl and the nickel tetracarbonyl is prepared; a mixture of the iron pentacarbonyl and the nickel tetracarbonyl is added into a first-stage fluidized bed among fluidized beds of multiple stages connected in series, and heated at 270° C. to be decomposed to obtain a catalyst; then, carbon monoxide is pumped out, and an inert gas is introduced into the fluidized beds of multiple stages, then the catalyst is distributed into each fluidized bed under the flowing action of the inert gas, and each stage of fluidized bed is kept at a temperature of 750° C. for reaction for 60 min. The above operations are all carried out under the condition of magnetic field.

After a mass ratio of the carbon content in the carbon nanotube finally generated to the catalyst is 5~7:3~5, the gas-solid mixture after the reaction is introduced into a gas-solid separator for gas-solid separation, and a solid composite carbon nanotube obtained is purified, wherein specific steps of the purification include: firstly, removing nickel from the composite carbon nanotube in a high-pressure environment containing carbon monoxide and having a temperature of 40° C.; then, removing iron from the composite carbon nanotube in a high-pressure environment containing carbon monoxide and having a temperature of 210° C., so as to finally obtain a purified carbon nanotube.

Embodiment 5

Firstly, iron pentacarbonyl and nickel tetracarbonyl in a mass ratio of 385:171 are weighed, and a carbon source containing carbon in a mass ratio of 5~7:3~5 to the iron pentacarbonyl and the nickel tetracarbonyl is prepared; a mixture of the iron pentacarbonyl and the nickel tetracarbonyl is added into a first-stage fluidized bed among fluidized beds of multiple stages connected in series, and heated at 250° C. to be decomposed to obtain a catalyst; then, carbon monoxide is pumped out, and an inert gas is introduced into the fluidized beds of multiple stages, then the catalyst is distributed into each fluidized bed under the flowing action of the inert gas, and each stage of fluidized bed is kept at a temperature of 650° C. for reaction for 80 min. The above operations are all carried out under the condition of magnetic field.

After a mass ratio of the carbon content in the carbon nanotube finally generated to the catalyst is 5~7:3~5, the gas-solid mixture after the reaction is introduced into a gas-solid separator for gas-solid separation, and a solid composite carbon nanotube obtained is purified, wherein specific steps of the purification include: firstly, removing nickel from the composite carbon nanotube in a high-pressure environment containing carbon monoxide and having a temperature of 43° C.; then, removing iron from the composite carbon nanotube in a high-pressure environment containing carbon monoxide and having a temperature of 220° C., so as to finally obtain a purified carbon nanotube.

Embodiment 6

Firstly, iron pentacarbonyl and nickel tetracarbonyl in a mass ratio of 390:175 are weighed, and a carbon source containing carbon in a mass ratio of 5~7:3~5 to the iron pentacarbonyl and the nickel tetracarbonyl is prepared; a mixture of the iron pentacarbonyl and the nickel tetracarbonyl is added into a first-stage fluidized bed among fluidized beds of multiple stages connected in series, and heated at 300° C. to be decomposed to obtain a catalyst; then, carbon monoxide is pumped out, and an inert gas is introduced into the fluidized beds of multiple stages, then the catalyst is distributed into each fluidized bed under the flowing action of the inert gas, and each stage of fluidized bed is kept at a temperature of 630° C. for reaction for 70 min. The above operations are all carried out under the condition of magnetic field.

After a mass ratio of the carbon content in the carbon nanotube finally generated to the catalyst is 5~7:3~5, the gas-solid mixture after the reaction is introduced into a gas-solid separator for gas-solid separation, and a solid composite carbon nanotube obtained is purified, wherein specific steps of the purification include: firstly, removing nickel from the composite carbon nanotube in a high-pressure environment containing carbon monoxide and having a temperature of 45° C.; then, removing iron from the composite carbon nanotube in a high-pressure environment containing carbon monoxide and having a temperature of 240° C., so as to finally obtain a purified carbon nanotube.

Embodiment 7

Firstly, iron pentacarbonyl and nickel tetracarbonyl in a mass ratio of 370:163 are weighed, and a carbon source containing carbon in a mass ratio of 5~7:3~5 to the iron pentacarbonyl and the nickel tetracarbonyl is prepared; a mixture of the iron pentacarbonyl and the nickel tetracarbonyl is added into a first-stage fluidized bed among fluidized beds of multiple stages connected in series, and heated at 225° C. to be decomposed to obtain a catalyst; then, carbon monoxide is pumped out, and an inert gas is introduced into the fluidized beds of multiple stages, then the catalyst is distributed into each fluidized bed under the flowing action of the inert gas, and each stage of fluidized bed is kept at a temperature of 600° C. for reaction for 90 min. The above operations are all carried out under the condition of magnetic field.

After a mass ratio of the carbon content in the carbon nanotube finally generated to the catalyst is 5~7:3~5, the gas-solid mixture after the reaction is introduced into a gas-solid separator for gas-solid separation, and a solid composite carbon nanotube obtained is purified, wherein specific steps of the purification include: firstly, removing iron from the composite carbon nanotube in a high-pressure environment containing carbon monoxide and having a temperature of 190° C.; then, removing nickel from the composite carbon nanotube in a high-pressure environment containing carbon monoxide and having a temperature of 38° C., so as to finally obtain a purified carbon nanotube.

Such configuration reduces the working temperature of each stage of fluidized bed, thereby reducing the heat radiated to the ambient during preparation of the carbon nanotube.

Embodiment 8

Firstly, iron pentacarbonyl and nickel tetracarbonyl in a mass ratio of 390:178 are weighed, and a carbon source containing carbon in a mass ratio of 5~7:3~5 to the iron pentacarbonyl and the nickel tetracarbonyl is prepared; a mixture of the iron pentacarbonyl and the nickel tetracarbonyl is added into a first-stage fluidized bed among fluidized beds of multiple stages connected in series, and heated at 315° C. to be decomposed to obtain a catalyst; then, carbon monoxide is pumped out, and an inert gas is introduced into the fluidized beds of multiple stages, then the catalyst is distributed into each fluidized bed under the flowing action of the inert gas, and each stage of fluidized bed is kept at a temperature of 800° C. for reaction for 40 min. The above operations are all carried out under the condition of magnetic field.

After a mass ratio of the carbon content in the carbon nanotube finally generated to the catalyst is 5~7:3~5, the gas-solid mixture after the reaction is introduced into a gas-solid separator for gas-solid separation, and a solid composite carbon nanotube obtained is purified, wherein specific steps of the purification include: firstly, removing iron from the composite carbon nanotube in a high-pressure environment containing carbon monoxide and having a temperature of 250° C.; then, removing nickel from the composite carbon nanotube in a high-pressure environment containing carbon monoxide and having a temperature of 55° C., so as to finally obtain a purified carbon nanotube.

By keeping the temperature of each stage of fluidized bed at 800° C. for reaction, the time of catalytic reaction is greatly shortened, such that the carbon nanotube can be obtained in a short time, thereby improving the preparation efficiency of the carbon nanotube.

Embodiment 9

Firstly, iron pentacarbonyl and nickel tetracarbonyl in a mass ratio of 390:178 are weighed, and a carbon source containing carbon in a mass ratio of 5~7:3~5 to the iron pentacarbonyl and the nickel tetracarbonyl is prepared; a mixture of the iron pentacarbonyl and the nickel tetracarbonyl is added into a first-stage fluidized bed among fluidized beds of multiple stages connected in series, and heated at 315° C. to be decomposed to obtain a catalyst; then, carbon monoxide is pumped out, and an inert gas is introduced into the fluidized beds of multiple stages, then the catalyst is distributed into each fluidized beds under the flowing action of the inert gas, and each stage of fluidized bed is kept at a temperature of 700° C. for reaction for 50 min. The above operations are all carried out under the condition of magnetic field.

After a mass ratio of the carbon content in the carbon nanotube finally generated to the catalyst is 5~7:3~5, the gas-solid mixture after the reaction is introduced into a gas-solid separator for gas-solid separation, and a solid composite carbon nanotube obtained is purified, wherein specific steps of the purification include: firstly, removing iron from the composite carbon nanotube in a high-pressure environment containing carbon monoxide and having a temperature of 250° C.; then, removing nickel from the composite carbon nanotube in a high-pressure environment containing carbon monoxide and having a temperature of 55° C., so as to finally obtain a purified carbon nanotube.

By keeping each stage of fluidized bed at 700° C. for reaction for 50 min, balance is realized between the reaction temperature and the reaction time, which reduces the heat radiated from each stage of fluidized bed to the ambient while ensuring the preparation efficiency of the carbon nanotube.

Embodiment 10

Firstly, iron pentacarbonyl and nickel tetracarbonyl in a mass ratio of 375:168 are weighed, and a carbon source containing carbon in a mass ratio of 5~7:3~5 to the iron pentacarbonyl and the nickel tetracarbonyl is prepared; a mixture of the iron pentacarbonyl and the nickel tetracarbonyl is added into a first-stage fluidized bed among fluidized beds of multiple stages connected in series, and heated at 270° C. to be decomposed to obtain a catalyst; then, carbon monoxide is pumped out, and an inert gas is introduced into the fluidized beds of multiple stages, then the catalyst is distributed into each fluidized bed under the flowing action of the inert gas, and each stage of fluidized bed is kept at a temperature of 750° C. for reaction for 60 min. The above operations are all carried out under the condition of magnetic field.

After a mass ratio of the carbon content in the carbon nanotube finally generated to the catalyst is 5~7:3~5, the gas-solid mixture after the reaction is introduced into a gas-solid separator for gas-solid separation, and a solid composite carbon nanotube obtained is purified, wherein specific steps of the purification include: firstly, removing iron from the composite carbon nanotube in a high-pressure environment containing carbon monoxide and having a temperature of 210° C.; then, removing nickel from the composite carbon nanotube in a high-pressure environment containing carbon monoxide and having a temperature of 40° C., so as to finally obtain a purified carbon nanotube.

Embodiment 11

Firstly, iron pentacarbonyl and nickel tetracarbonyl in a mass ratio of 385:171 are weighed, and a carbon source containing carbon in a mass ratio of 5~7:3~5 to the iron pentacarbonyl and the nickel tetracarbonyl is prepared; a mixture of the iron pentacarbonyl and the nickel tetracarbonyl is added into a first-stage fluidized bed among fluidized beds of multiple stages connected in series, and heated at 250° C. to be decomposed to obtain a catalyst; then, carbon monoxide is pumped out, and an inert gas is introduced into the fluidized beds of multiple stages, then the catalyst is distributed into each fluidized bed under the flowing action of the inert gas, and each stage of fluidized bed is kept at a temperature of 650° C. for reaction for 80 min. The above operations are all carried out under the condition of magnetic field.

After a mass ratio of the carbon content in the carbon nanotube finally generated to the catalyst is 5~7:3~5, the gas-solid mixture after the reaction is introduced into a gas-solid separator for gas-solid separation, and a solid composite carbon nanotube obtained is purified, wherein specific steps of the purification include: firstly, removing iron from the composite carbon nanotube in a high-pressure environment containing carbon monoxide and having a temperature of 220° C.; then, removing nickel from the composite carbon nanotube in a high-pressure environment containing carbon monoxide and having a temperature of 43° C., so as to finally obtain a purified carbon nanotube.

Embodiment 12

Firstly, iron pentacarbonyl and nickel tetracarbonyl in a mass ratio of 390:175 are weighed, and a carbon source containing carbon in a mass ratio of 5~7:3~5 to the iron pentacarbonyl and the nickel tetracarbonyl is prepared; a mixture of the iron pentacarbonyl and the nickel tetracarbonyl is added into a first-stage fluidized bed among fluidized beds of multiple stages connected in series, and heated at 300° C. to be decomposed to obtain a catalyst; then, carbon monoxide is pumped out, and an inert gas is introduced into the fluidized beds of multiple stages, then the catalyst is distributed into each fluidized bed under the flowing action of the inert gas, and each stage of fluidized bed is kept at a temperature of 630° C. for reaction for 70 min. The above operations are all carried out under the condition of magnetic field.

After a mass ratio of the carbon content in the carbon nanotube finally generated to the catalyst is 5~7:3~5, the gas-solid mixture after the reaction is introduced into a gas-solid separator for gas-solid separation, and a solid composite carbon nanotube obtained is purified, wherein specific steps of the purification include: firstly, removing iron from the composite carbon nanotube in a high-pressure environment containing carbon monoxide and having a temperature of 240° C.; then, removing nickel in the composite carbon nanotube in a high-pressure environment containing carbon monoxide and having a temperature of 45° C., so as to finally obtain a purified carbon nanotube.

Besides, an embodiment of the present disclosure further provides a device 100 for preparing a carbon nanotube, which includes fluidized beds of multiple stages connected in series, wherein the fluidized beds of multiple stages connected in series include a first-stage fluidized bed 110 and a third-stage fluidized bed 130 provided in series.

Figure 2:
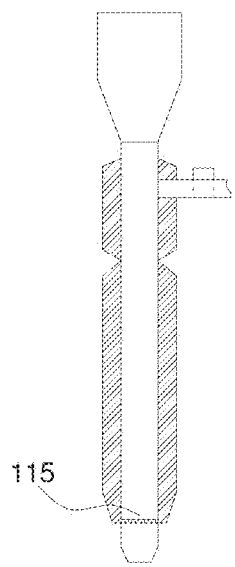
FIG. 2 is a sectional view of a first-stage fluidized bed in FIG. 1.

As shown in FIG. 1 and FIG. 2, the first-stage fluidized bed 110 includes a first heating section 111 provided in an upper portion of the first-stage fluidized bed 110 and a second heating section 112 provided in a lower portion of the first-stage fluidized bed 110, wherein the first heating section 111 is configured to provide a temperature for decomposing a mixture of iron pentacarbonyl and nickel tetracarbonyl, and the second heating section 112 is configured to provide a growth temperature of the carbon nanotube. Moreover, a carbon monoxide discharge port 113 is further provided in the upper portion of the first-stage fluidized bed 110, such that carbon monoxide generated after decomposition of iron pentacarbonyl and nickel tetracarbonyl can be discharged from the carbon monoxide discharge port 113. A bottom portion of the first-stage fluidized bed 110 is further provided with an air inlet 114, and an upper portion of the third-stage fluidized bed 130 is provided with a product discharge port 131, wherein the product discharge port 131 is communicated with a gas-solid separator 140, so that a gas-solid mixture in the fluidized beds of multiple stages connected in series enters the gas-solid separator 140 via the product discharge port 131 for carrying out gas-solid separation, and the separated solids are discharged from the product discharge port on the right side. Specifically, the structure of the third-stage fluidized bed 130 is similar to that of a common fluidized bed, and a heating device is further provided at an outer wall of the third-stage fluidized bed 130.

In the present embodiment, by providing the carbon monoxide discharge port 113 in the upper portion of the first-stage fluidized bed 110, carbon monoxide generated in the fluidized beds of multiple stages can float up by virtue of its density being lower than that of air, and gather at the carbon monoxide discharge port 113, and is further pumped away by the vacuum pump. Such configuration further improves exhaust efficiency of the carbon monoxide, so that the carbon monoxide generated by the reaction can be timely discharged.

In addition, in the present embodiment, the device for preparing a carbon nanotube may further include a purification device. Specifically, the purification device is communicated with the carbon monoxide discharge port 113, wherein the purification device is configured to convert carbon monoxide discharged from the carbon monoxide discharge port 113 into a gas such as carbon dioxide, which can be discharged to the outside. Such configuration reduces the phenomenon of environmental pollution caused by direct discharge of carbon monoxide to the external environment, and reduces physical damage to operators.

Optionally, in the present embodiment, the gas-solid separator 140 is a cyclone separator.

With continued reference to FIG. 2, in the present embodiment, a flow equalizing device 115 may be provided in the lower portion of the first-stage fluidized bed 110, and specifically, the flow equalizing device 115 is provided above the air inlet 114. By providing the flow equalizing device 115, a gas entering through the air inlet 114 can be dispersed to all directions under the action of the flow equalizing device 115, so as to ensure the distribution uniformity of the gas entering through the air inlet 114 in the fluidized beds of multiple stages connected in series as a whole.

The flow equalizing device 115 may be a screen plate having a plurality of through holes.

With continued reference to FIG. 1, in the present embodiment, the device 100 for preparing a carbon nanotube may further include a magnetic field generating device. Specifically, this magnetic field generating device includes a first magnetic pole 151 and a second magnetic pole 152, wherein the first magnetic pole 151 is provided at an end of the first-stage fluidized bed 110 away from the third-stage fluidized bed 130 (left side of the first-stage fluidized bed 110 in FIG. 1), the second magnetic pole 152 is provided at an end of the third-stage fluidized bed 130 away from the first-stage fluidized bed 110 (right side of the first-stage fluidized bed 110 in FIG. 1), moreover, the first magnetic pole 151 and the second magnetic pole 152 are magnetically different.

In the working process of the device 100 for preparing a carbon nanotube, a magnetic field is formed between the first magnetic pole 151 and the second magnetic pole 152, such that the catalyst in each fluidized bed can be arranged in the direction of magnetic induction lines, such that a growth direction of the carbon nanotube is consistent with that of the magnetic induction lines, which not only ensures a more regular shape of the carbon nanotubes prepared, but also improves the performance of the carbon nanotubes prepared.

With continued reference to FIG. 1, the first-stage fluidized bed 110 and the third-stage fluidized bed 130 may be communicated with each other through a first connecting pipe 161, wherein the first connecting pipe 161 has one end communicated with the first-stage fluidized bed 110 at a position on the first heating section 111, and the other end communicated with the bottom portion of the third-stage fluidized bed 130, moreover, the carbon monoxide discharge port 113 is provided at a position on the first connecting pipe 161 close to the first-stage fluidized bed 110.

By providing the carbon monoxide discharge port 113 on the first connecting pipe 161, the same outlet (carbon monoxide discharge port 113) is shared by the discharge of carbon monoxide from the first-stage fluidized bed 110 and the discharge of the gas-solid mixture from the first-stage fluidized bed 110, so that the first-stage fluidized bed 110 does not need to be additionally provided with a gas discharge port, thereby reducing the setup cost of the first-stage fluidized bed 110.

In addition, in the present embodiment, the device 100 for preparing a carbon nanotube may further include a valve (not shown in the drawings) provided on the first connecting pipe 161, wherein the valve is configured to control discharge of carbon monoxide or to control connection and disconnection between the first-stage fluidized bed 110 and a next-stage fluidized bed.

A working process of the device 100 for preparing a carbon nanotube for preparing a carbon nanotube is as follows: introducing iron pentacarbonyl and nickel tetracarbonyl into the first-stage fluidized bed 110 from the top portion of the first-stage fluidized bed 110, decomposing the iron pentacarbonyl and the nickel tetracarbonyl under the heating action of the first heating section 111 to obtain a catalyst formed by iron and nickel alloy and carbon monoxide gas from the decomposition; then, discharging the carbon monoxide generated by the above decomposition from the carbon monoxide discharge port 113; after discharging the carbon monoxide, introducing an inert gas into the first-stage fluidized bed 110 through the air inlet 114, enabling the catalyst to be distributed in each fluidized bed under the flowing action of the inert gas, and adding a carbon source into the device 100 for preparing a carbon nanotube from the top portion or bottom portion of the first-stage fluidized bed 110, wherein at the same time, heating devices at an outer wall of the second heating section 112 and the third-stage fluidized bed 130 start to operate, and at this time, the magnetic field generating device starts to operate, so that the carbon nanotube gradually grows in the fluidized bed; after the reaction is finished, the gas-solid mixture in the fluidized beds of multiple stages is introduced into the gas-solid separator 140 for separation to obtain the composite carbon nanotube, and the carbon nanotube prepared above is discharged through the product discharge port 131.

With continued reference to FIG. 1, in the present embodiment, the first magnetic pole 151 and the second magnetic pole 152 may both have a strip-shaped structure, and the first magnetic pole 151 and the second magnetic pole 152 both extend in a vertical direction. Such configuration increases the range of magnetic field generated between the first magnetic pole 151 and the second magnetic pole 152, so that the growth range of the carbon nanotubes in the fluidized beds of multiple stages which is according to the direction of magnetic field is increased, and uniformity of growth of the carbon nanotubes is further improved.

Optionally, upper ends of the first magnetic pole 151 and the second magnetic pole 152 both extend to above the fluidized beds of multiple stages, and lower ends of the first magnetic pole 151 and the second magnetic pole 152 both extend to below the fluidized beds of multiple stages. In the present embodiment, an insulating layer may further be wrapped outside each of the first heating section 111 and the second heating section 112. Such configuration reduces heat conduction and heat exchange between an internal environment and an external environment of the first-stage fluidized bed 110, so that heat loss is reduced, and sufficiency and reliability of catalytic reaction in the first-stage fluidized bed 110 are ensured.

Figure 3:
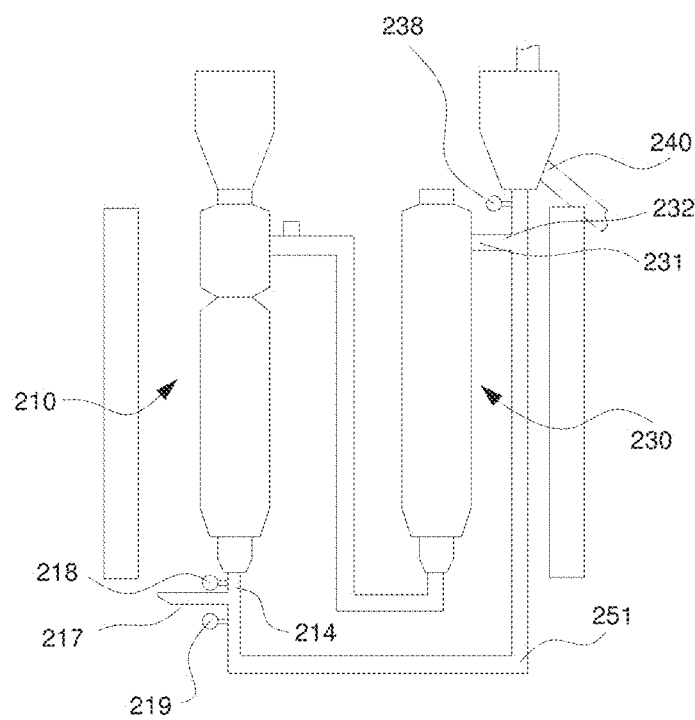
FIG. 3 is a structural schematic diagram of another device for preparing a carbon nanotube provided in an embodiment of the present disclosure.

As shown in FIG. 3, an embodiment of the present disclosure further provides a device 200 for preparing a carbon nanotube, which has the same implementation principle and provides the same technical effects as the above device 100 for preparing a carbon nanotube, and therefore, for a brief description, details are not repeated, and differences therebetween are described as follows.

With continued reference to FIG. 3, in the device 200 for preparing a carbon nanotube, an air inlet 214 of a first-stage fluidized bed 210 is communicated with a product discharge port 231 of a third-stage fluidized bed 230 through a circulating pipe 251. With such configuration, in the preparation process of the carbon nanotube, the reaction can be carried out in a path from the first-stage fluidized bed 210 to the third-stage fluidized bed 230 and then circulated to the first-stage fluidized bed 210 through the circulating pipe 251, which not only reduces the number of fluidized beds connected in series, so that the device 200 for preparing a carbon nanotube is more miniaturized and integrated, but also enables the inert gas discharged by the third-stage fluidized bed 230 to flow back into the first-stage fluidized bed 210 for cyclic utilization, thereby effectively reducing the flow of the inert gas introduced into the whole device in a later period, and saving a production cost of the carbon nanotubes.

With continued reference to FIG. 3, in the present embodiment, an end of the circulating pipe 251 close to the air inlet 214 is connected with an inert gas inlet pipe 217, meanwhile, the circulating pipe 251 can be further provided with a first valve 218 configured to control entering of the inert gas into the first-stage fluidized bed 210, wherein the first valve 218 is located between the inert gas inlet pipe 217 and the air inlet 214. The circulating pipe 251 may be further provided with a second valve 219 for blocking the product discharge port 231 from the air inlet 214 or communicating the product discharge port with the air inlet, the gas-solid separator 240 is communicated with the third-stage fluidized bed 230 through a product discharge pipe 232, the product discharge pipe 232 is connected with the circulating pipe 251, and the product discharge pipe 232 is provided with a third valve 238 at a position close to the gas-solid separator 240.

In the working process of the device 200 for preparing a carbon nanotube for preparing a carbon nanotube, the first valve 218 and the second valve 219 are opened, and the third valve 238 is closed, at which time the whole device is in a circulating operation state, that is to say, gas in the first-stage fluidized bed 210 can flow into the third-stage fluidized bed 230, and gas in the third-stage fluidized bed 230 in turn can flow back into the first-stage fluidized bed through the circulating pipe 251. When the reaction is finished, the second valve 219 is closed, reflux from the third-stage fluidized bed 230 to the first-stage fluidized bed 210 is cut off, and at the same time, the third valve 238 is opened, the gas-solid mixture in the fluidized beds of multiple stages is introduced into the gas-solid separator 240 for gas-solid separation, thus obtaining the composite carbon nanotubes, and the prepared carbon nanotubes described above are discharged through the product discharge port.

Figure 4:
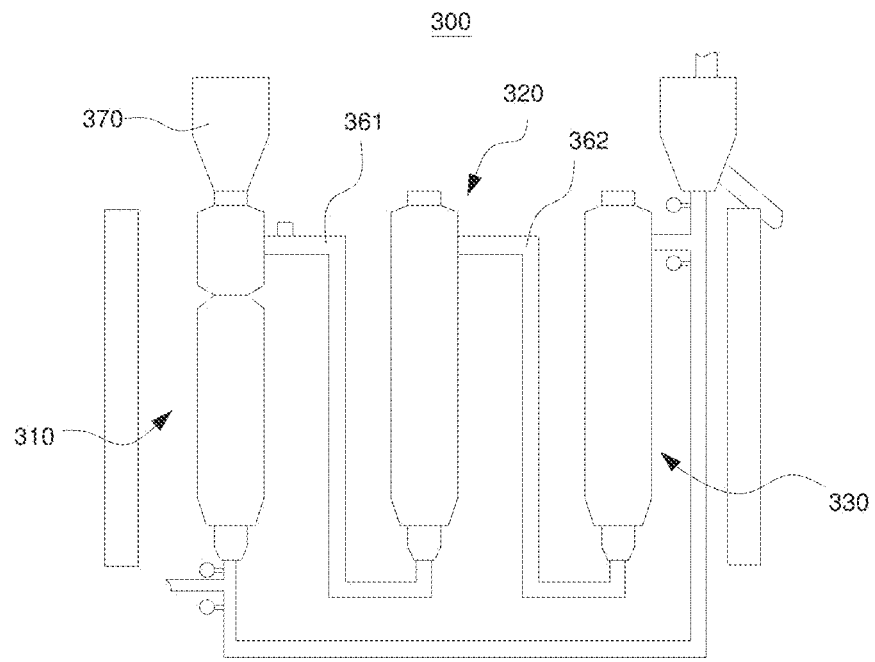
FIG. 4 is a structural schematic diagram of a further device for preparing a carbon nanotube provided in an embodiment of the present disclosure.

As shown in FIG. 4, an embodiment of the present disclosure further provides a device 300 for preparing a carbon nanotube, which has the same implementation principle and provides the same technical effects as the above device 200 for preparing a carbon nanotube, and therefore, for brief description, details are not repeated, and differences therebetween are described as follows.

With continued reference to FIG. 4, a device 300 for preparing a carbon nanotube provided in the present embodiment includes a first-stage fluidized bed 310, one second-stage fluidized bed 320 and a third-stage fluidized bed 330 sequentially connected in series, wherein the first-stage fluidized bed 310 and the second fluidized bed 320 are connected through a first connecting pipe 361, and the second fluidized bed 320 and the third-stage fluidized bed 330 are connected through a second connecting pipe 362.

Figure 5:
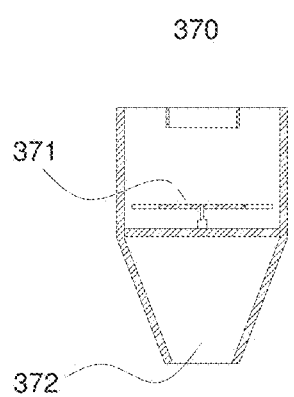
FIG. 5 is a sectional view of a feeding device in FIG. 3.

With continued reference to FIG. 4, and in combination with FIG. 5, in the present embodiment, a feeding device 370 is provided in a top portion of the first-stage fluidized bed 310, and specifically, a rotary feeder 371 is provided inside the feeding device 370, wherein the rotary feeder 371 includes a plurality of blades disposed in parallel to a horizontal direction. By providing the rotary feeder 371, when a mixture of iron pentacarbonyl and nickel tetracarbonyl or a carbon source is added into the first-stage fluidized bed 310 by the feeding device 370, the above materials can more uniformly enter the first-stage fluidized bed 310, thereby ensuring uniformity of carbon nanotube preparation.

In addition, by providing the second-stage fluidized bed 320 between the first-stage fluidized bed 310 and the third-stage fluidized bed 330, an internal capacity of the fluidized beds of multiple stages is effectively increased, thereby increasing the number of carbon nanotubes prepared within the same period of time, and increasing the production efficiency of the device 300 for preparing a carbon nanotube.

It should be noted that, it may be the case that one second-stage fluidized bed 320 is provided between the above-mentioned first-stage fluidized bed 320 and third-stage fluidized bed 330, but it is not limited thereto, and other configurations also may be adopted, for example, two or more second-stage fluidized beds 320 are provided between the first-stage fluidized bed 310 and the third-stage fluidized bed 330, so as to further increase the production amount of carbon nanotubes within the same period of time. Therefore, the specific number of second-stage fluidized beds 320 provided is not limited in the present embodiment as long as the production amount of carbon nanotubes can be increased by providing a certain number of second fluidized beds 320.

With continued reference to FIG. 4 and FIG. 5, in the present embodiment, the feeding device 370 may be funnel-shaped. Such configuration plays a certain role in guiding the materials which enter from above the feeding device 370, so that the materials can be reliably fed into the first-stage fluidized bed 310.

Figure 6:
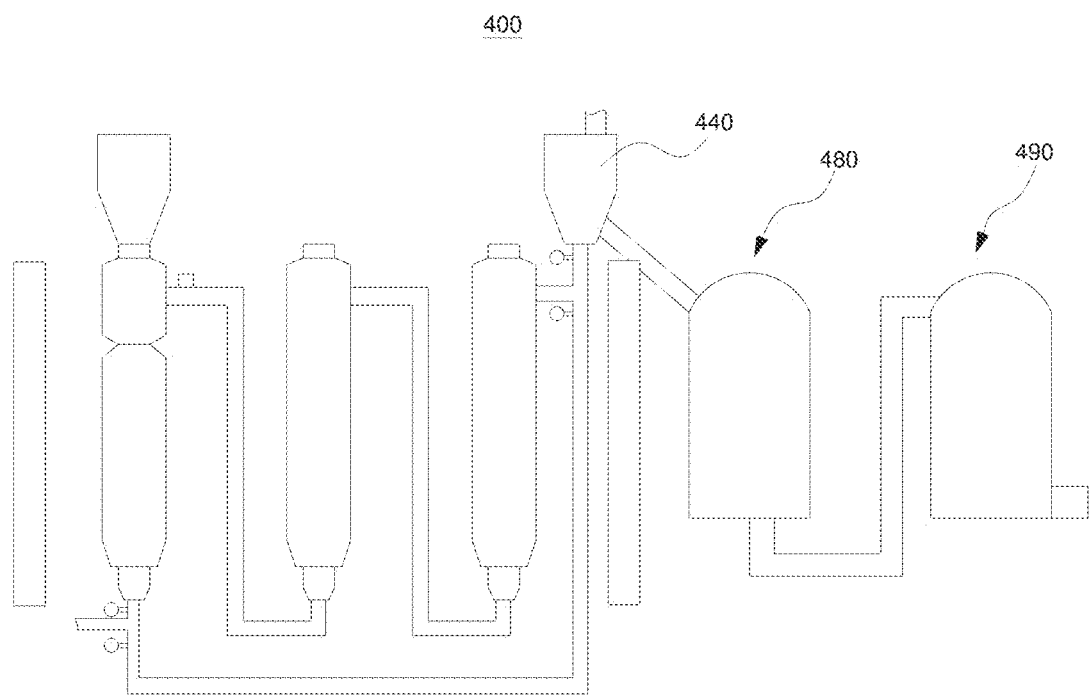
FIG. 6 is a structural schematic diagram of a further device for preparing a carbon nanotube provided in an embodiment of the present disclosure.

As shown in FIG. 6, an embodiment of the present disclosure further provides a device 400 for preparing a carbon nanotube, which has the same implementation principle and provides the same technical effects as the above device 200 for preparing a carbon nanotube, and therefore, for brief description, details are not repeated, and differences are described as follows.

With continued reference to FIG. 6, in the present embodiment, a device 400 for preparing a carbon nanotube may further include a first purification device 480 and a second purification device 490. Specifically, the first purification device 480 is connected with a gas-solid separator 440, and the second purification device 490 is connected with the first purification device 480. The first purification device 480 is configured to remove nickel from a composite carbon nanotube, so that the nickel reacts with carbon monoxide to generate nickel tetracarbonyl in liquid state, thus the nickel tetracarbonyl is removed under the action of a solid-liquid separating device provided in the first purification device 480; the second purification device 490 is configured to remove iron from the composite carbon nanotube, so that the iron reacts with carbon monoxide to generate liquid iron pentacarbonyl, thus the iron pentacarbonyl is removed under the action of the solid-liquid separating device provided in the second purification device 490.

In the present embodiment, the carbon monoxide discharge port communicated with the first-stage fluidized bed may be connected with the first purification device 480 and the second purification device 490. During operation of the device 400 for preparing a carbon nanotube, carbon monoxide, which is a catalytic reaction product discharged through the carbon monoxide discharge port, can participate in a purification reaction of the carbon nanotube so as to remove impurities iron and nickel from the carbon nanotube. Such configuration not only realizes recycling of the product carbon monoxide and reduces the waste of resources, but also realizes purification treatment on carbon monoxide to a certain degree, so that the phenomenon of environmental pollution caused by direct discharge of the carbon monoxide from the carbon monoxide discharge port to the outside is reduced.

In summary, as the iron pentacarbonyl and nickel tetracarbonyl are used in the method for preparing a carbon nanotube provided in the present disclosure to enter the reaction device, and are decomposed to generate the iron-nickel alloy as a catalyst having a uniform nanoscale particle size before growth of the carbon nanotubes, the carbon nanotubes prepared have a better quality. Moreover, by reasonably controlling the reaction time, and adjusting the ratio of the catalyst to the carbon in the carbon source, the carbon and the iron-nickel alloy in the composite carbon nanotube prepared have a relatively preferable mass ratio, so that not only the composite carbon nanotubes prepared have a higher magnetization intensity and a larger coercive force, but also the composite carbon nanotubes can easily react with carbon monoxide to remove iron-nickel alloy impurities contained therein, thus iron carbonyl and nickel carbonyl that can be recycled are generated, emission of waste gas is greatly reduced in this process, which is more environment-friendly, and involves a lower production cost.

The device for preparing a carbon nanotube provided in the present disclosure, due to its reasonable arrangement of each unit, can be used for implementing the method for preparing a carbon nanotube provided in the present disclosure, so as to prepared a carbon nanotube with relatively preferable performance. As the configuration in which multiple fluidized beds can be connected in series is used for the device, the number of fluidized beds of the device can be adjusted according to production requirement of actual production.

In addition, it also should be noted that in the present embodiment, the product prepared by the above preparation method may be the above carbon nanotube, and may also be a carbon-containing product such as graphene and carbon fiber.

An embodiment of the present disclosure further provides a carbon nanotube, which is prepared by the above method for preparing a carbon nanotube. This carbon nanotube has a good performance.

Figure 7:
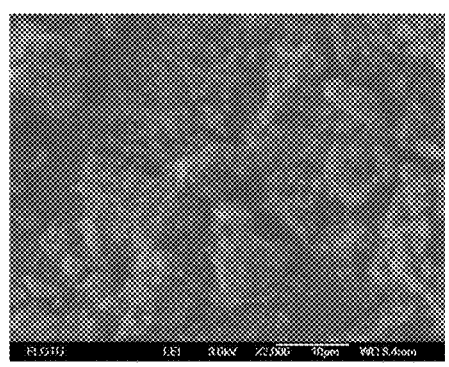
FIG. 7 is a structural diagram of the carbon nanotube, observed under a scanning electron microscope, provided in an embodiment of the present disclosure.

As shown in FIG. 7, the carbon nanotube observed under a scanning electron microscope (SEM) is a large amount of entangled nanoscale fibrous objects, and has no clearly visible impurities such as amorphous carbon, carbon fibers, and catalyst particles.

Figure 8:
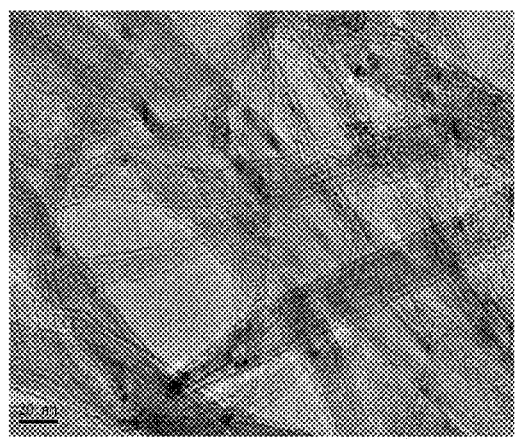
FIG. 8 is another structural diagram of the carbon nanotube, observed under a transmission electron microscope, provided in an embodiment of the present disclosure.

As shown in FIG. 8, a result observed under a transmission electron microscope (TEM) shows that the carbon nanotubes prepared and synthesized by the above method are high-purity multi-wall carbon nanotubes having an outer diameter of 3-25 nm, an average outer diameter of 14.6 nm, and an average inner diameter of 12.5 nm.

The above-mentioned are merely some embodiments of the present disclosure and not intended to limit the present disclosure. For one skilled in the art, various modifications and variations may be made to the present disclosure. Any amendments, equivalent replacements, improvements and so on, within the spirit and principle of the present disclosure, should be covered by the scope of protection of the present disclosure.

Industrial Applicability

The method and device for preparing a carbon nanotube and the carbon nanotube provided in the present disclosure enable the carbon nanotube prepared to have a better quality and a larger coercive force. Moreover, in the preparation process of the carbon nanotube, the discharge of wastes is reduced, which is more environment-friendly, and involves a lower production cost.

What is claimed is:

1. A method for preparing a carbon nanotube, comprising:
   adding iron pentacarbonyl and nickel tetracarbonyl into fluidized beds of multiple stages connected in series and performing decomposition to obtain a nano iron-nickel composite catalyst having a particle size of 1-10 nm, and discharging carbon monoxide generated; and
   adding a carbon source and introducing an inert gas into the fluidized beds of multiple stages connected in series, with a ratio of mass of carbon in the carbon source to mass of the catalyst being 5-7:3-5, and performing reaction under a condition of heating at 600-800° C. for 40-90 min, so as to generate a composite carbon nanotube, wherein in the composite carbon nanotube a mass percentage of content of carbon is 50%-70%, and a mass percentage of content of the catalyst is 30%-50%.

2. The method for preparing a carbon nanotube according to claim 1, wherein a mixture of the iron pentacarbonyl and the nickel tetracarbonyl is added into the fluidized beds, and a heating temperature of the fluidized beds is controlled between 225-315° C.

3. The method for preparing a carbon nanotube according to claim 1, wherein a mass ratio of the iron pentacarbonyl to the nickel tetracarbonyl is 370-392:163-178.

4. The method for preparing a carbon nanotube according claim 1, wherein after the reaction in the fluidized beds of multiple stages connected in series is finished, a gas-solid mixture generated in the fluidized beds of multiple stages connected in series is separated by using a gas-solid separator to obtain the composite carbon nanotube.

5. The method for preparing a carbon nanotube according to claim 4, further comprising purification carried out for the composite carbon nanotube separated by the gas-solid separator, wherein a purification step comprises:
   disposing the composite carbon nanotube in an atmosphere of carbon monoxide under a condition with a pressure of 150-200 atm and a temperature of 38-55° C. to synthesize nickel tetracarbonyl, so as to remove metal nickel from the composite carbon nanotube to obtain a secondary carbon nanotube; and
   disposing the secondary carbon nanotube in an environment containing carbonic oxide and having a pressure of 150-200 atm and a temperature of 190-250° C. to generate iron pentacarbonyl, so as to remove metal iron in the secondary carbon nanotube, and obtain a carbon nanotube of high purity.

6. The method for preparing a carbon nanotube according claim 1, wherein the fluidized beds of multiple stages connected in series are disposed in an electromagnetic field.

7. The method for preparing a carbon nanotube according to claim 1, wherein the carbon source comprises a hydrocarbon gas.

8. The method for preparing a carbon nanotube according to claim 2, wherein a mass ratio of the iron pentacarbonyl to the nickel tetracarbonyl is 370-392:163-178.

9. The method for preparing a carbon nanotube according to claim 2, wherein after the reaction in the fluidized beds of multiple stages connected in series is finished, a gas-solid mixture generated in the fluidized beds of multiple stages connected in series is separated by using a gas-solid separator to obtain the composite carbon nanotube.

10. The method for preparing a carbon nanotube according to claim 3, wherein after the reaction in the fluidized beds of multiple stages connected in series is finished, a gas-solid mixture generated in the fluidized beds of multiple stages connected in series is separated by using a gas-solid separator to obtain the composite carbon nanotube.

* * * * *